US009455850B2

(12) United States Patent
Wiley

(10) Patent No.: US 9,455,850 B2
(45) Date of Patent: *Sep. 27, 2016

(54) THREE PHASE AND POLARITY ENCODED SERIAL INTERFACE

(71) Applicant: QUALCOMM Incorporated, San Diego, CA (US)

(72) Inventor: George Alan Wiley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 14/796,207

(22) Filed: Jul. 10, 2015

(65) Prior Publication Data

US 2015/0319013 A1 Nov. 5, 2015

Related U.S. Application Data

(63) Continuation of application No. 13/826,546, filed on Mar. 14, 2013, now Pat. No. 9,083,598, which is a continuation of application No. 13/301,454, filed on Nov. 21, 2011, now Pat. No. 8,472,551, which is a continuation of application No. 11/712,941, filed on Mar. 2, 2007, now Pat. No. 8,064,535.

(51) Int. Cl.
*H04L 25/34* (2006.01)
*H04L 25/49* (2006.01)
(Continued)

(52) U.S. Cl.
CPC ............. *H04L 25/4917* (2013.01); *H04L 5/20* (2013.01); *H04L 25/0272* (2013.01); *H04L 27/22* (2013.01); *H04L 25/0282* (2013.01); *H04L 25/0294* (2013.01); *H04L 25/0298* (2013.01)

(58) Field of Classification Search
CPC ........... H04L 25/4908; H04L 25/4904; H04L 25/14; H04L 25/4925; H03M 5/12

USPC ................ 375/259–264, 284–288, 290–293; 341/50, 58, 68–70

See application file for complete search history.

(56) References Cited

U.S. PATENT DOCUMENTS 4,201,958 A 5/1980 Ahamed
4,980,898 A 12/1990 Silvian
(Continued)

FOREIGN PATENT DOCUMENTS

CN 1871635 A 11/2006
CN 101171776 B 5/2011
(Continued)

OTHER PUBLICATIONS

International Preliminary Report on Patentability—PCT/US2013/030937, The International Bureau of WIPO—Geneva, Switzerland, Sep. 25, 2014.

(Continued)

*Primary Examiner* — James M Perez
(74) *Attorney, Agent, or Firm* — Raphael Freiwirth

(57) ABSTRACT

A high speed serial interface is provided. In one aspect, the high speed serial interface uses three phase modulation for jointly encoding data and clock information. Accordingly, the need for de-skewing circuitry at the receiving end of the interface is eliminated, resulting in reduced link start-up time and improved link efficiency and power consumption. In one embodiment, the high speed serial interface uses fewer signal conductors than conventional systems having separate conductors for data and clock information. In another embodiment, the serial interface allows for data to be transmitted at any speed without the receiving end having prior knowledge of the transmission data rate. In another aspect, the high speed serial interface uses polarity encoded three phase modulation for jointly encoding data and clock information. This further increases the link capacity of the serial interface by allowing for more than one bit to be transmitted in any single baud interval.

30 Claims, 15 Drawing Sheets

(51) Int. Cl.
*H04L 27/22* (2006.01)
*H04L 5/20* (2006.01)
*H04L 25/02* (2006.01)

(56) References Cited

U.S. PATENT DOCUMENTS

| | | |
|---|---|---|
| 5,259,002 A | 11/1993 | Carlstedt |
| 5,359,595 A | 10/1994 | Weddle et al. |
| 5,381,414 A | 1/1995 | Gibson |
| 5,563,526 A | 10/1996 | Hastings et al. |
| 5,664,948 A | 9/1997 | Dimitriadis et al. |
| 5,682,157 A | 10/1997 | Asmussen et al. |
| 5,733,131 A | 3/1998 | Park |
| 5,809,519 A | 9/1998 | Lee |
| 5,852,630 A | 12/1998 | Langberg et al. |
| 5,939,939 A | 8/1999 | Gaynor et al. |
| 6,081,513 A | 6/2000 | Roy |
| 6,091,709 A | 7/2000 | Harrison et al. |
| 6,243,761 B1 | 6/2001 | Mogul et al. |
| 6,256,509 B1 | 7/2001 | Tanaka et al. |
| 6,278,429 B1 | 8/2001 | Ruth et al. |
| 6,288,739 B1 | 9/2001 | Hales et al. |
| 6,346,832 B1 | 2/2002 | Young |
| 6,359,931 B1 | 3/2002 | Perino et al. |
| 6,430,196 B1 | 8/2002 | Baroudi |
| 6,452,420 B1 | 9/2002 | Wong |
| 6,556,628 B1 | 4/2003 | Poulton et al. |
| 6,587,037 B1 | 7/2003 | Besser et al. |
| 6,611,503 B1 | 8/2003 | Fitzgerald et al. |
| 6,649,377 B1 | 11/2003 | Allard et al. |
| 6,654,565 B2 | 11/2003 | Kenny |
| 6,662,019 B2 | 12/2003 | Kamel et al. |
| 6,694,377 B1 | 2/2004 | Beyer |
| 6,703,868 B2 | 3/2004 | Savaria et al. |
| 6,778,493 B1 | 8/2004 | Ishii |
| 6,797,891 B1 | 9/2004 | Blair et al. |
| 6,813,638 B1 | 11/2004 | Sevanto et al. |
| 6,865,610 B2 | 3/2005 | Bolosky et al. |
| 6,867,668 B1 | 3/2005 | Dagostino et al. |
| 6,914,637 B1 | 7/2005 | Wolf et al. |
| 7,113,550 B2 | 9/2006 | Stonecypher et al. |
| 7,143,177 B1 | 11/2006 | Johnson et al. |
| 7,145,411 B1 | 12/2006 | Blair et al. |
| 7,233,773 B2 | 6/2007 | Hansen et al. |
| 7,263,133 B1 | 8/2007 | Miao |
| 7,269,430 B2 | 9/2007 | Moorti et al. |
| 7,336,139 B2 | 2/2008 | Blair et al. |
| 7,339,502 B2 | 3/2008 | Furtner |
| 7,529,957 B2 | 5/2009 | Krantz et al. |
| 7,539,882 B2 | 5/2009 | Jessup et al. |
| 7,688,929 B2 | 3/2010 | Co |
| 7,826,551 B2 | 11/2010 | Lee et al. |
| 7,859,356 B2 | 12/2010 | Pandey |
| 8,024,477 B2 | 9/2011 | Rothman et al. |
| 8,064,535 B2 | 11/2011 | Wiley et al. |
| 8,472,551 B2 | 6/2013 | Wiley et al. |
| 8,848,810 B2 | 9/2014 | Lee et al. |
| 8,996,740 B2 | 3/2015 | Wiley et al. |
| 9,083,598 B2 * | 7/2015 | Wiley .......................... 375/288 |
| 2002/0061072 A1 | 5/2002 | Pickering et al. |
| 2002/0064247 A1 | 5/2002 | Ahn et al. |
| 2002/0112070 A1 | 8/2002 | Ellerbrock et al. |
| 2002/0181618 A1 | 12/2002 | Muranaka |
| 2003/0117184 A1 | 6/2003 | Fecteau et al. |
| 2004/0039504 A1 | 2/2004 | Coffee et al. |
| 2005/0012492 A1 | 1/2005 | Mihalka |
| 2005/0144225 A1 | 6/2005 | Anderson et al. |
| 2005/0151868 A1 | 7/2005 | Fraenkel et al. |
| 2005/0156755 A1 | 7/2005 | Miller |
| 2005/0204057 A1 | 9/2005 | Anderson et al. |
| 2006/0034326 A1 | 2/2006 | Anderson et al. |
| 2006/0192697 A1 | 8/2006 | Quick et al. |
| 2006/0271678 A1 | 11/2006 | Jessup et al. |
| 2007/0009018 A1 | 1/2007 | Wang |
| 2007/0160155 A1 | 7/2007 | Choi |
| 2007/0164883 A1* | 7/2007 | Furtner .......................... 341/126 |
| 2007/0164884 A1 | 7/2007 | Ihs |
| 2008/0212709 A1 | 9/2008 | Wiley et al. |
| 2009/0082056 A1 | 3/2009 | Iwanaga et al. |
| 2009/0225873 A1 | 9/2009 | Lee et al. |
| 2010/0215118 A1 | 8/2010 | Ware et al. |
| 2010/0235673 A1 | 9/2010 | Abbasfar |
| 2011/0084737 A1 | 4/2011 | Oh et al. |
| 2011/0138210 A1 | 6/2011 | Belali et al. |
| 2011/0268225 A1 | 11/2011 | Cronie et al. |
| 2011/0294359 A1 | 12/2011 | Cho et al. |
| 2011/0299555 A1 | 12/2011 | Cronie et al. |
| 2011/0302478 A1 | 12/2011 | Cronie et al. |
| 2012/0051241 A1 | 3/2012 | Mori et al. |
| 2012/0155565 A1 | 6/2012 | Wiley |
| 2012/0230626 A1 | 9/2012 | Metz et al. |
| 2013/0051162 A1 | 2/2013 | Amirkhany et al. |
| 2013/0241759 A1 | 9/2013 | Wiley et al. |
| 2013/0339507 A1 | 12/2013 | Wiley |
| 2014/0003543 A1 | 1/2014 | Wiley et al. |
| 2014/0006649 A1 | 1/2014 | Wiley et al. |
| 2014/0112401 A1 | 4/2014 | Wiley et al. |
| 2014/0153665 A1 | 6/2014 | Wiley et al. |

FOREIGN PATENT DOCUMENTS

| | | |
|---|---|---|
| EP | 1207649 | 5/2002 |
| JP | 2002199032 A | 7/2002 |
| WO | 9202988 A1 | 2/1992 |
| WO | 2005041164 | 5/2005 |
| WO | 2011134678 A1 | 11/2011 |
| WO | 2011151469 A1 | 12/2011 |
| WO | 2012089803 A2 | 7/2012 |

OTHER PUBLICATIONS

International Preliminary Report on Patentability—PCT/US2013/045404, The International Bureau of WIPO—Geneva, Switzerland, Dec. 24, 2014.
Hsueh, "Crosstalk Suppression Technique for Multi-Wire High-Speed I/O Links," ProQuest Dissertations and Theses; 2010; UCLA, 189 pages.
International Preliminary Report on Patentability—PCT/US2013/048758—The International Bureau of WIPO Geneva, Switzerland, Oct. 7, 2014.
International Preliminary Report on Patentability—PCT/US2013/048989, The International Bureau of WIPO—Geneva, Switzerland, Oct. 7, 2014.
International Search Report and Written Opinion—PCT/US2008/055566, International Search Authority—European Patent Office—Nov. 24, 2008.
International Search Report and Written Opinion—PCT/US2013/030937—ISA/EPO—Jul. 4, 2013.
International Search Report and Written Opinion—PCT/US2013/045404—ISA/EPO—Sep. 12, 2013.
International Search Report and Written Opinion—PCT/US2013/048758—ISA/EPO—Aug. 16, 2013.
International Search Report and Written Opinion—PCT/US2013/048989—ISAEPO—Jan. 23, 2014.
International Search Report and Written Opinion—PCT/US2014/067463—ISA/EPO—Apr. 16, 2015.
International Search Report—PCT/US2009/034943, International Search Authority—European Patent Office Jun. 24, 2009.
Poulton J., et al. "Multiwire Differential Signaling," UNC-CH Department of Computer Science, Version 1.1, Aug. 6, 2003.
Sevanto, J., "Multimedia messaging service for GPRS and UMTS", IEEE on WCNC, Sep. 1999, pp. 1422-1426, vol. 3.
Taiwan Search Report—TW098107168—TIPO—May 10, 2012.
Taiwan Search Report—TW102121240—TIPO—Feb. 13, 2014.
Written Opinion—PCT/US2009/034943, International Search Authority—European Patent Office Jun. 24, 2009.
Zheng, "Skew compensation techniques for multi-gigabit wire-line data communications," Dissertation, The University of Texas at Dallas, 2010, 126 pages.
Zogopoulos, "A Low-Power High-Speed Single-Ended Parallel Link Using Three-Level Differential Encoding," USC, Dissertation, May 2007, 92 pages.

* cited by examiner

| Transition | Transmitted Bits |
|---|---|
| A to B positive or negative in bit n to B to C positive in bit n+1 | 11 |
| A to B positive or negative in bit n to B to C negative in bit n+1 | 10 |
| A to B positive or negative in bit n to C to A positive in bit n+1 | 01 |
| A to B positive or negative in bit n to C to A negative in bit n+1 | 00 |
| B to C positive or negative in bit n to C to A positive in bit n+1 | 11 |
| B to C positive or negative in bit n to C to A negative in bit n+1 | 10 |
| B to C positive or negative in bit n to A to B positive in bit n+1 | 01 |
| B to C positive or negative in bit n to A to B negative in bit n+1 | 00 |
| C to A positive or negative in bit n to A to B positive in bit n+1 | 11 |
| C to A positive or negative in bit n to A to B negative in bit n+1 | 10 |
| C to A positive or negative in bit n to B to C positive in bit n+1 | 01 |
| C to A positive or negative in bit n to B to C negative in bit n+1 | 00 |

FIG. 8

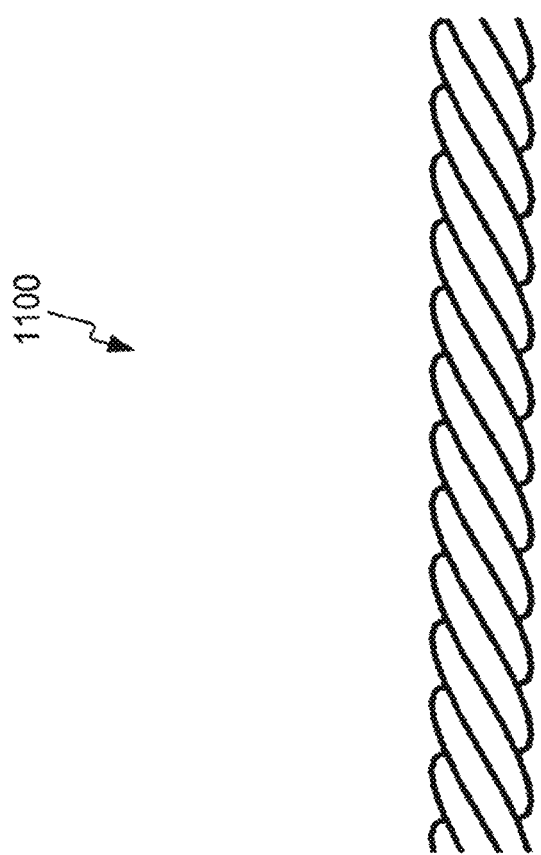
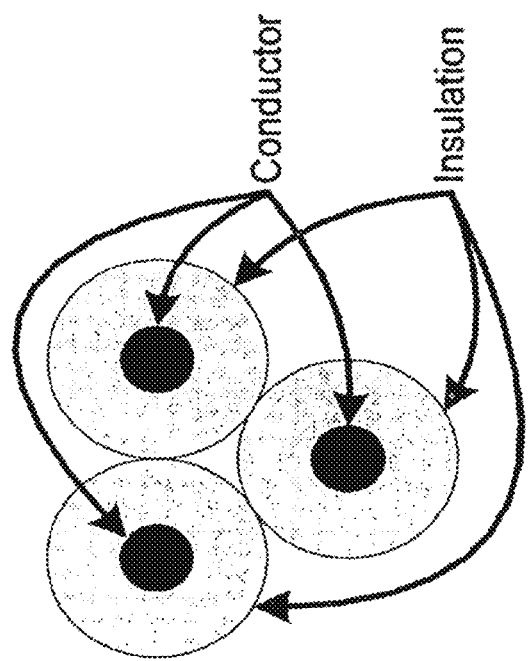
FIG. 11

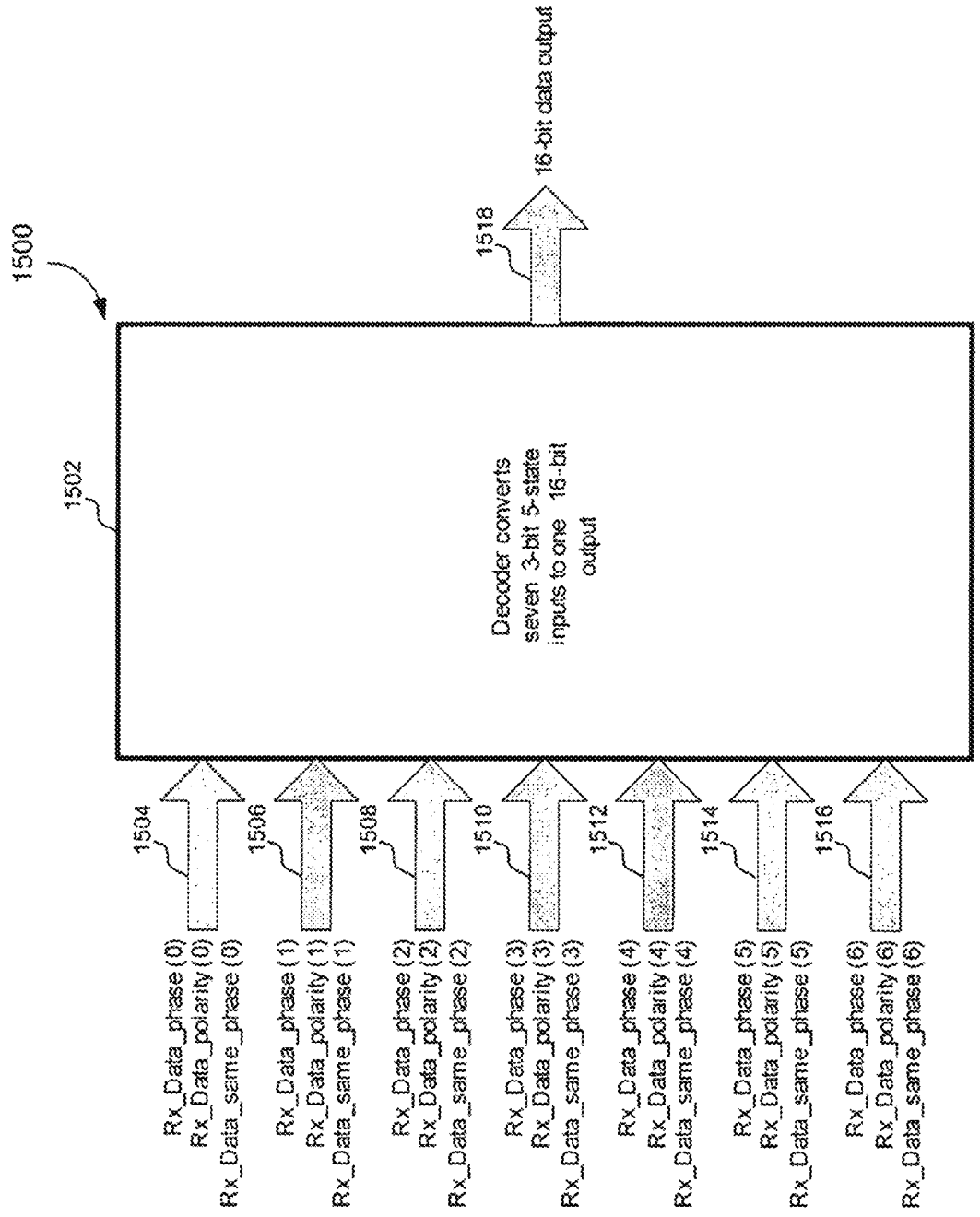

THREE PHASE AND POLARITY ENCODED SERIAL INTERFACE

CROSS REFERENCE TO RELATED APPLICATIONS

The present Application for Patent is a continuation of U.S. Utility patent application Ser. No. 13/826,546, filed Mar. 14, 2013 (to be issued as U.S. Pat. No. 9,083,598), which is a continuation of U.S. Utility patent application Ser. No. 13/301,454, filed Nov. 21, 2011 (issued as U.S. Pat. No. 8,472,551), which is a continuation of U.S. Utility patent application Ser. No. 11/712,941, filed Mar. 2, 2007 (issued as U.S. Pat. No. 8,064,535), all of which are assigned to the assignee hereof and hereby expressly incorporated by reference.

BACKGROUND

1. Field

The present invention relates generally to high speed serial communication. More particularly, the invention relates to three phase modulation data encoding schemes for high speed serial communication.

2. Background

In the field of high speed serial communication, demand for ever increasing data rates continues to grow.

Many conventional high speed serial interface systems use non-return to zero (NRZ) data encoding with separate data and clock signals. This separation of the data and clock signals, however, typically results in skew between the two signals, limiting the maximum possible link data rate of the interface.

Typically, de-skewing circuitry is used at the receiving end of the serial interface to eliminate skew between the data and the clock signals. Consequently, both the real estate requirements and the link start-up time of the serial interface are increased, with the latter becoming disadvantageous when the interface is being used intermittently at a low duty cycle to minimize system power consumption.

Other conventional serial interface systems are more immune to skew by using data and strobe signals, but still suffer from skew problems when operating at high speeds.

Additionally, certain integrated receiver devices are typically built with slower logic because they have larger feature sizes in order to drive high voltages. This is the case, for example, for integrated LCD Controller-Driver circuits that are used to drive LCD panels. As such, it would be difficult to implement a high-speed serial interface for such devices using conventional systems.

What is needed therefore is a high speed serial interface that resolves the above-described problems of conventional serial interface systems. Further, a high speed serial interface with increased capacity and reduced power consumption relative to conventional systems is needed.

BRIEF SUMMARY OF THE INVENTION

A high speed serial interface is provided herein.

In one aspect, the high speed serial interface uses a three phase modulation data encoding scheme for jointly encoding data and clock information. Accordingly, the need for de-skewing circuitry at the receiving end of the interface is eliminated, resulting in reduced link start-up time and improved link efficiency and power consumption. In one embodiment, the high speed serial interface uses fewer signal conductors than conventional systems with separate conductors for data and clock information. In another embodiment, the serial interface allows for data to be transmitted at any speed without the receiving end having any prior knowledge of the transmission data rate.

In another aspect, the high speed serial interface uses a polarity encoded three phase modulation data encoding scheme for jointly encoding data and clock information. This, in addition to the above-described advantages, further increases the link capacity of the serial interface by allowing for more than one bit to be transmitted in any single baud interval.

In a further aspect, the polarity encoded three phase modulation data encoding scheme is used to implement high-speed serial interfaces for certain receiver drivers with slower logic circuits. By encoding at least two bits per transition on the interface, the encoding scheme allows the data transition rate to be half of the normal serial data rate.

A high-speed interface employing the three phase modulation data encoding scheme provided herein consumes half the current as other high-speed interfaces using the same drivers. This is because only one driver output is active at one time instead of having two simultaneously active outputs as is commonly the case in other serial interfaces (e.g., data and clock or data and strobe). This power consumption reduction is coupled with the ability of a high-speed interface employing the three phase modulation data encoding scheme to send data at least twice the rate of other serial interfaces.

Further embodiments, features, and advantages of the present invention, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 8 is an example state table of a polarity encoded three phase modulation data encoding scheme.

FIG. 11 illustrates an example implementation of signal conductors in a cable for enabling the three phase modulation data encoding schemes.

FIG. 15 illustrates an example data decoder for decoding the output of the data recovery circuit of FIGS. 13 and 14.

The present invention will be described with reference to the accompanying drawings. The drawing in which an element first appears is typically indicated by the leftmost digit(s) in the corresponding reference number.

DETAILED DESCRIPTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Data Encoding with Embedded Timing Information

As discussed above, in order to eliminate skew between data and clock signals or the need for de-skewing circuitry in a serial interface, it is desirable to jointly encode data and clock information (or embed timing information in the data signal). One common technique for realizing that is by using a differential data encoding scheme, whereby data and clock information are jointly encoded in state transitions of a single signal.

The majority of differential data encoding schemes are level differential schemes, whereby state transitions are defined in terms of changes in the level (magnitude) of the data and clock signal.

Figure 1:
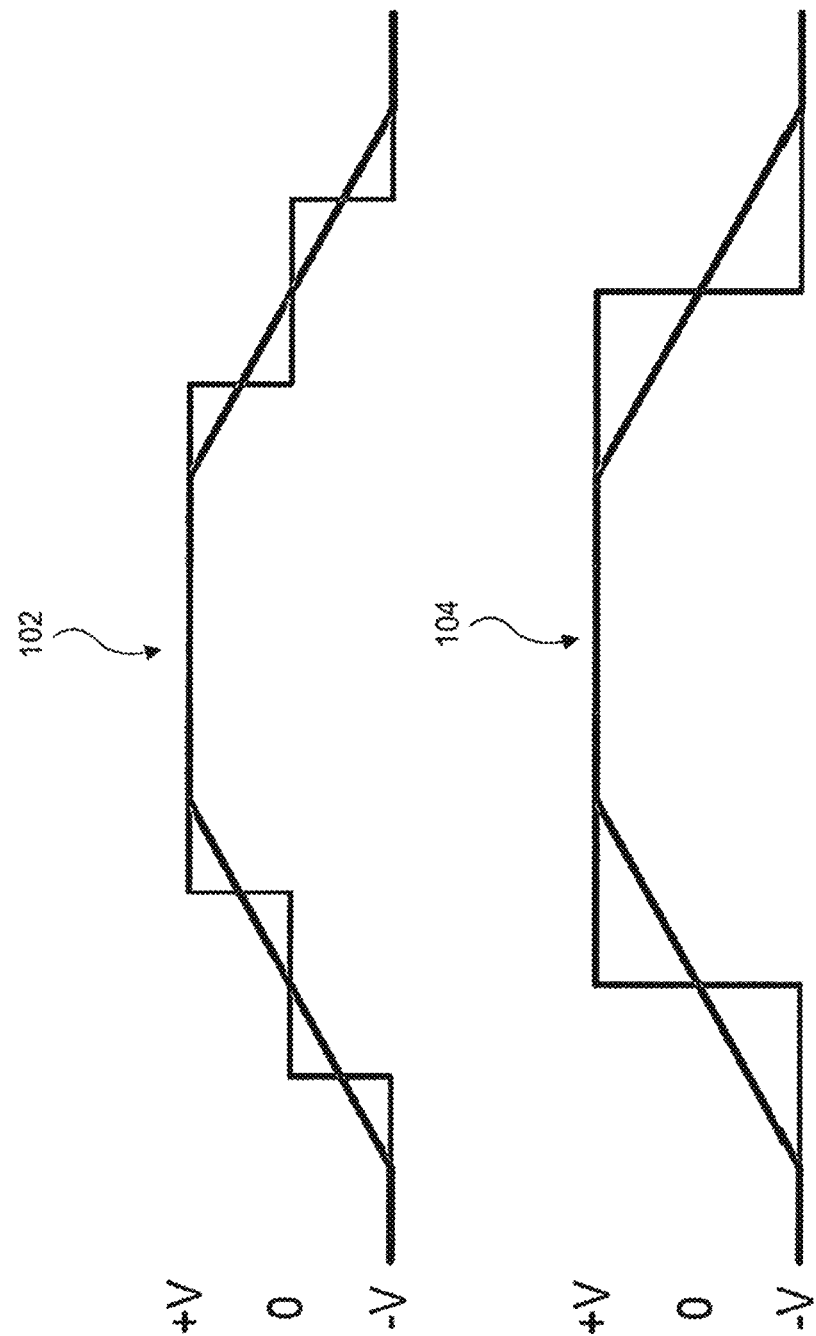
FIG. 1 illustrates example transitions in a 3-level differential data encoding scheme.

FIG. 1 illustrates example transitions in a 3-level differential data encoding scheme. According to the scheme of FIG. 1, a signal level (voltage) transition from: −V to 0 is a logic 0, from −V to +V is a logic 1, from 0 to −V is a logic 0, from 0 to +V is a logic 1, from +V to 0 is a logic 1, and from +V to −V is a logic 0.

Example transitions 102 and 104 illustrate two signal level transitions whereby the signal level changes from −V to +V. Transition 102 includes a first transition from −V to 0 followed by a second transition from 0 to +V, to transmit a 01 data sequence. Transition 104 includes a single transition from −V to +V to transmit a logic 1.

However, as shown in FIG. 1, due to the signal slew rate being slow compared with the response time of the data recovery circuitry at the receiving end, both transitions 102 and 104 appear identical and are interpreted as 01 by the recovery circuitry. Similar transition decoding problems occur on +V to −V transitions in the case illustrated in FIG. 1, or when the slew rate is faster than the response time of the data recovery circuit.

This ambiguity in decoding state transitions is due to having transitions that must pass through intermediate states in order to reach a desired state. A differential data encoding scheme with "circular" state transitions is therefore needed to resolve ambiguous state transitions in differential data encoding schemes.

Differential Data Encoding with Circular State Transitions

Figure 2:
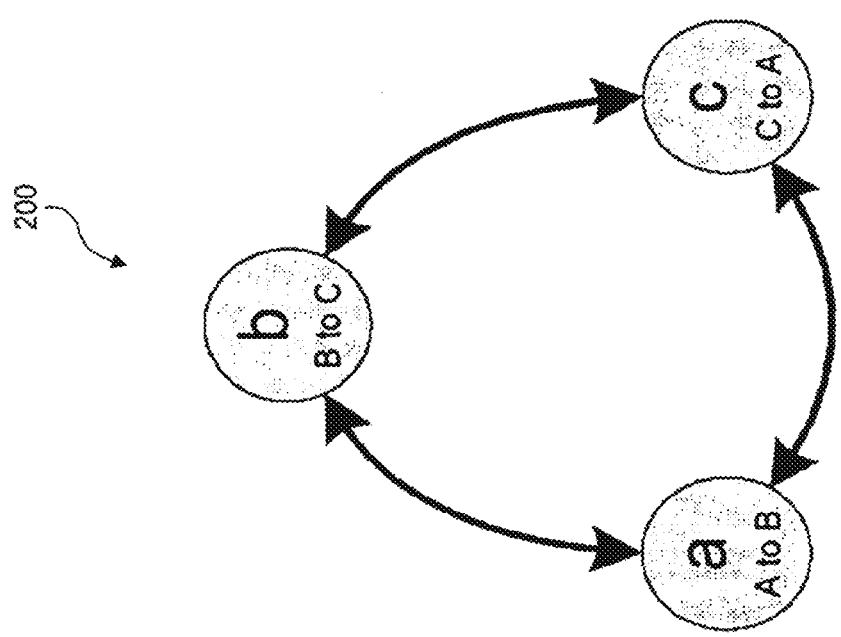
FIG. 2 illustrates a circular state diagram.

FIG. 2 illustrates a circular state diagram 200, which can be used to define state transitions in a differential data encoding scheme. According to state diagram 200, data is encoded based on transitions between three states a, b, and c. Note that transition between any two states (a to b, b to a, b to c, c to b, a to c, and c to a) occurs in a single step without traversing intermediate states. As such, differential data encoding schemes based on state diagram 200 would be free of state transition decoding problems, as discussed above.

Figure 3:
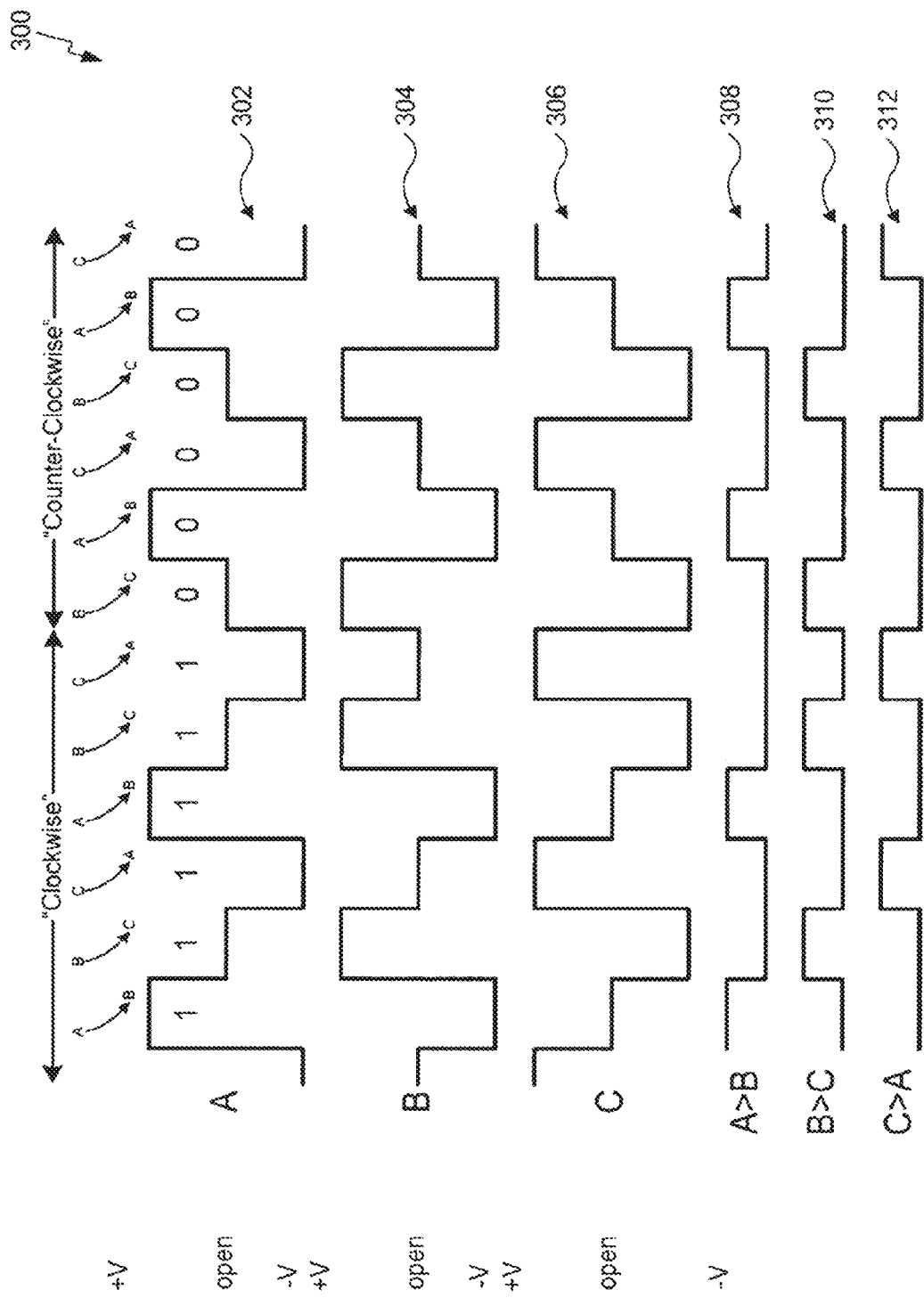
FIG. 3 is an example that illustrates a three phase modulation data encoding scheme.

FIG. 3 illustrates a three phase modulation data encoding scheme 300 based on the circular state diagram 200 of FIG. 2. According to data encoding scheme 300, a 3-phase signal that rotates in two directions is transmitted using three conductors A, B, and C. The three signals (carried by conductors A, B, and C) that make up the 3-phase signal are independent, with each signal being 120 degrees out of phase relative to the remaining two.

At any time, exactly two of conductors A, B, and C carry a signal, with the data encoding states being defined in terms of signal flow between conductors. In one embodiment, three states (corresponding respectively to states a, b, c of FIG. 2) are defined with signal flow from A to B, B to C, and C to A. Transitions between the three states are then defined according to state diagram 200 to ensure circular state transitions. In one embodiment, clockwise transitions (A to B) to (B to C), (B to C) to (C to A), and (C to A) to (A to B) are used to transmit a logic 1, while counter-clockwise transitions (B to C) to (A to B), (A to B) to (C to A), and (C to A) to (B to C) are used to transmit a logic 0.

Referring back to FIG. 3, a data encoding example using the three phase modulation scheme is shown. Signals 302, 304, and 306 illustrate voltage signals applied to conductors A, B, and C, respectively. At any time, a first conductor is coupled to a positive voltage (+V, for example), a second conductor is coupled to a negative voltage (−V, for example), while the remaining third conductor is open circuited. As such, the encoding state is determined by the current flow between the first and second conductors. It is also noted that only one of states (A to B), (B to C), and (C to A) can be true at any time as illustrated by signals 308 (A>B), 310 (B>C), and 312 (C to A), with clockwise state transitions used to transmit a logic 1 and counter-clockwise state transitions used to transmit a logic 0. In one embodiment, signals 308, 310, and 312 are generated using comparators that compare voltages across conductors A, B, and C.

Figure 4:
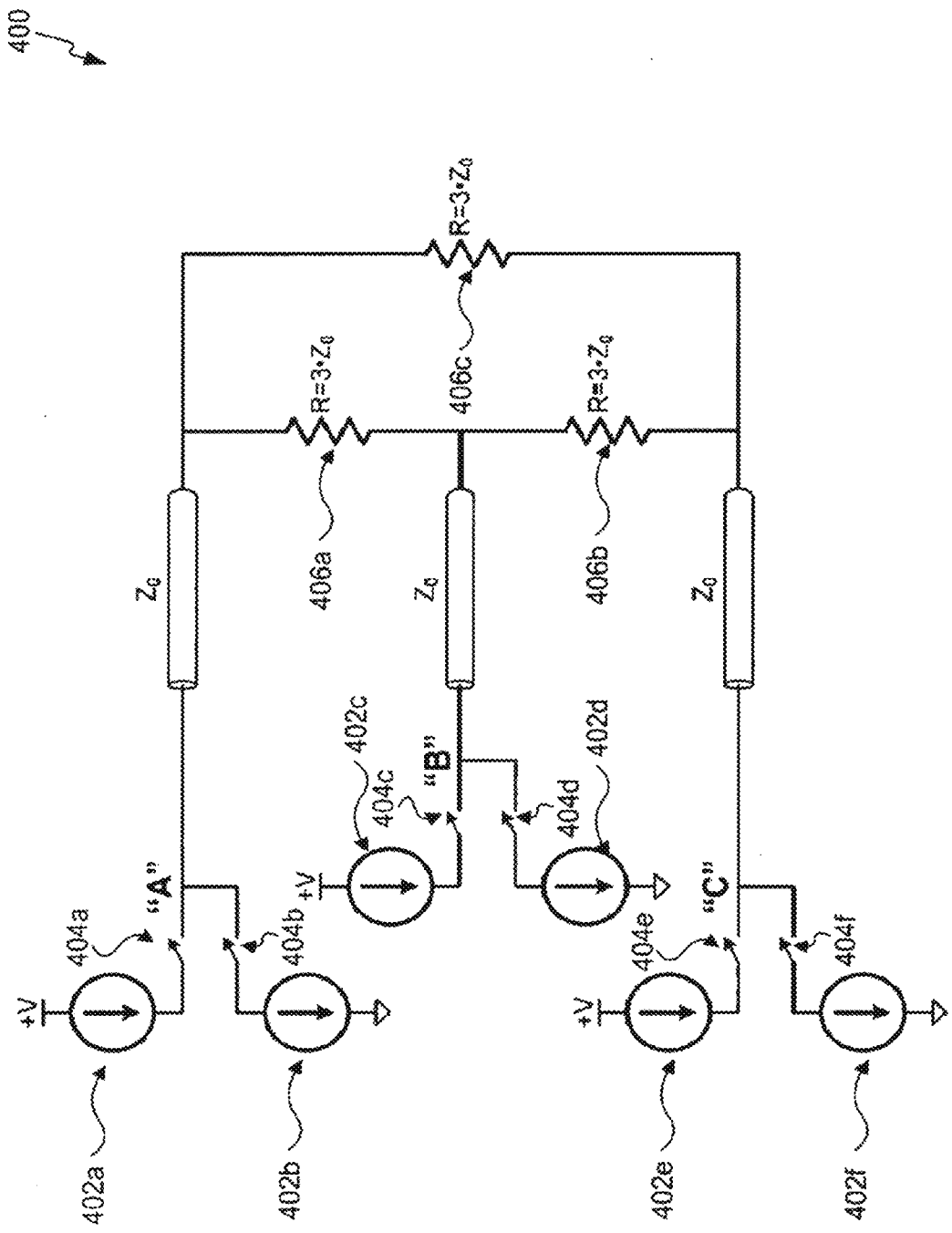
FIG. 4 illustrates a serial interface transmitter for implementing a three phase modulation data encoding scheme.

FIG. 4 illustrates a serial interface transmitter circuit 400 for implementing the three phase modulation data encoding scheme 300 of FIG. 3. Circuit 400 is implemented using current driver circuitry. Other circuit implementations also exist as can be appreciated by a person skilled in the art based on the teachings herein.

Circuit 400 includes a plurality of current sources 402*a-f* that can be coupled using switches 404*a-f* to first ends of conductors A, B, and C. Second ends of conductors A, B, and C are coupled together using termination impedances 406*a-c*. In one embodiment, each of conductors A, B, and C has a natural impedance of value $Z_0$, with termination impedances 406*a-c* each having an impedance value of $3Z_0$.

Figure 5:
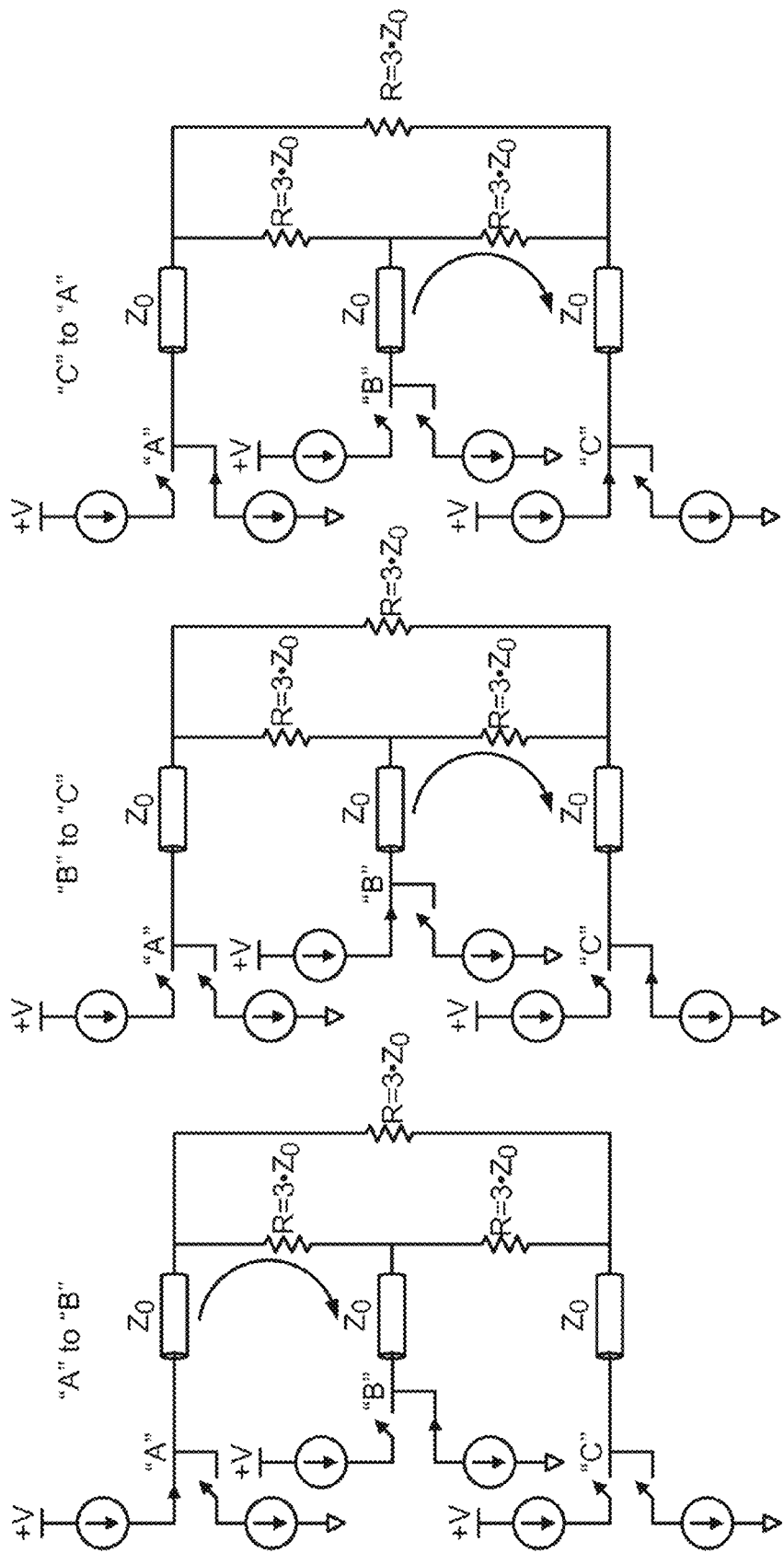
FIG. 5 illustrates current flow scenarios that correspond to encoding states according to a three phase modulation data encoding scheme.

At any time, exactly two of switches 404*a-f* are closed to cause a current flow between exactly two of conductors A, B, and C. As such, a single current path exists at any time in the circuit. Further, in accordance with encoding scheme 300, current is only allowed to flow from conductor A to conductor B, from conductor B to conductor C, or from conductor C to conductor A. These three current flow scenarios correspond to the only three valid encoding states of data encoding scheme 300 and are illustrated in FIG. 5 with respect to transmitter circuit 400.

Data Recovery Circuit

At the receiving end of the serial interface, a data recovery circuit is used to decode the data transmitted by the transmitter circuit. In one embodiment, voltages across termination resistors 406*a-b* in transmitter circuit 400 are monitored to detect state transitions. For example, signals similar to signals A>B 308, B>C 310, and C>A 312 of FIG. 3 are generated, whereby at any time exactly one of these signals is high, indicating the current encoding state.

Figure 6:
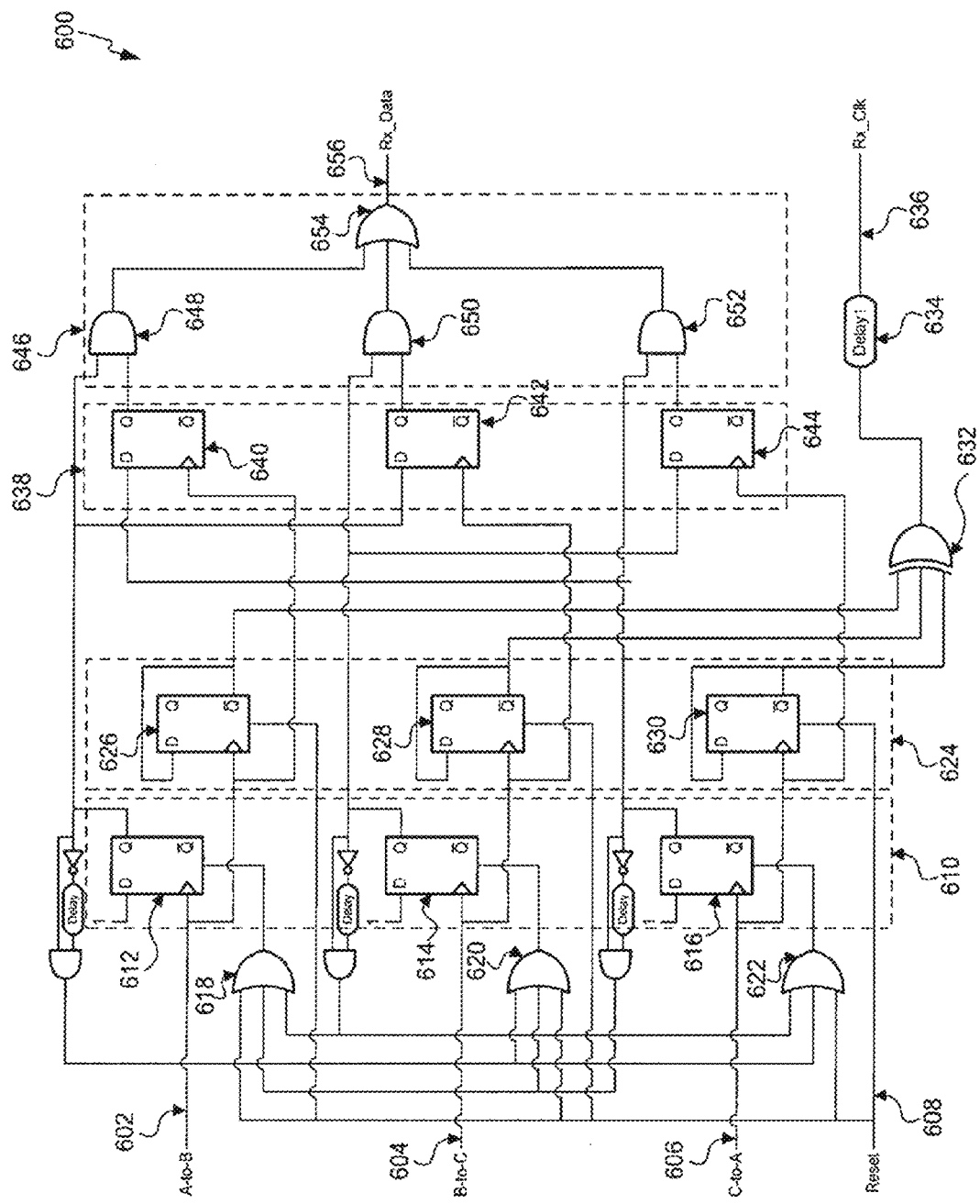
FIG. 6 illustrates an example data recovery circuit for a three phase modulation data encoding scheme.

FIG. 6 illustrates an example data recovery circuit 600 which can be used to decode data transmitted according to a three phase modulation data encoding scheme. Other data recovery circuit implementation can also be used as would be understood by a person skilled in the art based on the teachings herein.

Data recovery circuit 600 includes first, second, and third layers 610, 624, and 638 of D flip flops and a multiplexer circuit 646.

Data recovery circuit 600 receives input signals A-to-B 602, B-to-C 604, and C-to-A 606. At any time, exactly one of signals 602, 604, and 606 is high, indicating the current encoding state being transmitted. Signals 602, 604, and 606 are input respectively into first layer D flip flops 612, 614, and 616.

First layer D flip flops 612, 614, and 616 capture the most recent state transition as indicated by signals 602, 604, and 606. Note that each of D flip flops 612, 614, and 616 has its D data input coupled to a logic 1 and is set whenever its respective clock input 602, 604, or 606 experiences a rising edge transition. Also note that whenever one of D flip flops 612, 614, and 616 is set, it asynchronously resets the other two first layer D flip flops. In one embodiment, this is done by coupling the Q output of each first layer D flip flop through a rising edge triggered pulse circuit to the reset inputs of the other two first layer D flip flops. For example, in the embodiment of FIG. 6, the Q output of D flip flop 612 is coupled through OR gates 620 and 622 respectively to the reset inputs of D flip flops 614 and 616. In an embodiment, to ensure that D flip-flops 612, 614, and 616 are only reset momentarily when a non-respective state occurs, the Q outputs of D flip-flops 612, 614, and 616 are coupled to OR gates 618, 620, and 622 through a circuitry, which ensures that OR gates 618, 620, and 622 are only provided with a narrow positive pulse and not a continuous signal of value one. For example, the Q output of D flip-flop 612 is coupled to OR gates 620 and 622 through an AND gate, which receives as inputs said Q output and a delayed inverted version thereof.

Second layer D flip flops 626, 628, and 630 are configured as toggle flip flops with their Q_bar outputs connected to their D inputs. Accordingly, second layer flip flops 626, 628, and 630 toggle at rising edges of their respective clock input signal 602, 604, and 606. Note that the rising edges in signals 602, 604, and 606 correspond to state transitions in the data encoding scheme. As such, since exactly one state transition may occur at any time, only one of second layer D flip flops 626, 628, 630 toggles at any time. The Q_bar outputs of flip flops 626, 628, and 630 are input into a three input XOR gate 632 to generate a receiver clock Rx_Clk 636. Note that receiver clock 636 will toggle whenever any one of the Q_bar outputs of flip flops 626, 628, and 630 toggles, thereby generating a half rate clock.

Third layer D flip flops 640, 642, and 644 have clock inputs respectively driven by signals A-to-B 602, B-to-C 604, and C-to-A 606. Their D inputs are cross-coupled to Q outputs of the first layer, such that the Q output of first layer flip flop 616 is coupled to the D input of flip flop 640, the Q output of first layer flip flop 612 is coupled to the D input of flip flop 642, and the Q output of first layer flip flop 614 is coupled to the D input of flip flop 644.

As such, third layer flip flops 640, 642, and 644 capture C-to-A, A-to-B, and B-to-C state occurrences, respectively, and output logic 1 for (C-to-A) to (A-to-B), (A-to-B) to (B-to-C), and (B-to-C) to (C-to-A) transitions, respectively. These transitions are clockwise transitions as indicated above with respect to FIG. 3. For counter-clockwise transitions, flip flops 640, 642, and 644 all output logic 0. Note that since exactly one state transition may occur at any time, only one of the Q outputs of flip flops 640, 642, and 644 can be a logic 1 at any time.

The Q outputs of flip flops 640, 642, and 644 are input into multiplexer circuit 646, with the Q outputs from the first flip flop layer 610 providing the select inputs of the multiplexer. In one embodiment, multiplexer 646 includes a layer of AND gates 648, 650, and 652 followed by a three input OR gate 654. AND gates 648, 650, and 652 provide the inputs of OR gate 654, which provides output signal 656 of data recovery circuit 600. Note that output signal 656 is a logic 1 whenever any one of AND gates 648, 650, and 652 outputs a logic 1, which only occurs on clockwise state transitions, as described above. Accordingly, output signal 656 is a logic 1 for clockwise state transitions and a logic 0 for counter-clockwise state transitions, thereby having the ability to recover information encoded according to the three phase modulation scheme.

Impact of Timing Offset on Three Phase Modulation

Figure 7:
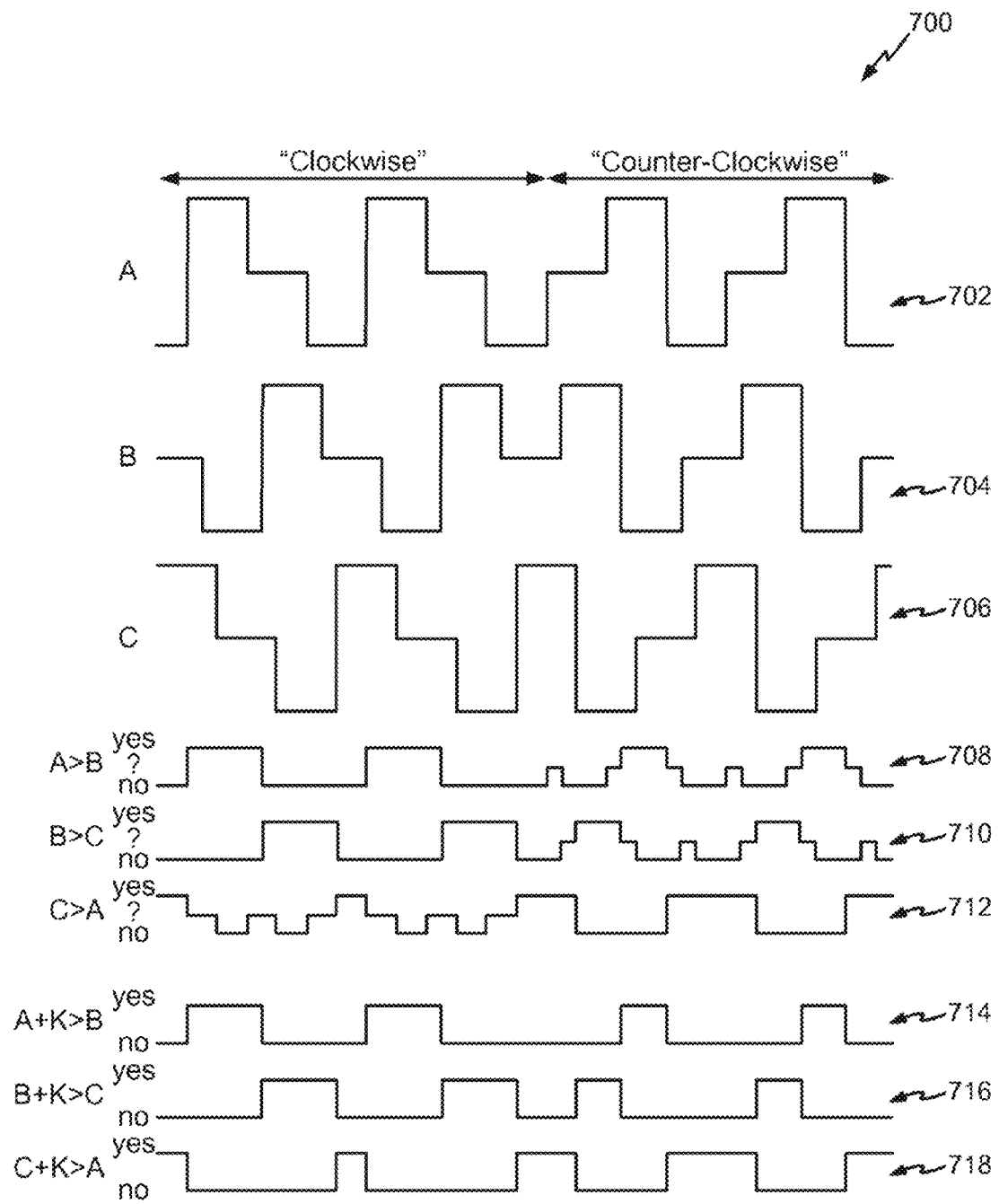
FIG. 7 illustrates the impact of timing offsets on the three phase modulation data encoding scheme of FIG. 3.

FIG. 7 is an example 700 that illustrates the impact of timing offsets on the three phase modulation data encoding scheme. As shown in FIG. 7, a timing offset between signals A 702, B 704, and C 706 of the 3-phase data and clock signal causes phase overlaps in the 3-phase signal. Typically, this timing offset may be due to differences in signal delays between conductors A, B, and C. As a result, ambiguous conditions may appear in signals A>B 708, B>C 710, and C>A 712, which represent the inputs of the data recovery circuit. Fortunately, however, these ambiguous conditions can be resolved through the addition of a voltage or a current offset, as illustrated in signals 714, 716, and 718.

Polarity Encoded Three Phase Modulation

As described above, the three phase modulation data encoding scheme uses clockwise state transitions to transmit logic ones and counter-clockwise state transitions to transmit logic zeros. As such, exactly one data bit is transmitted during each state transition, whether clockwise or counter-clockwise.

However, the capacity of the three phase modulation data encoding scheme can be further increased by exploiting the polarity of the encoding states, in addition to the directionality of state transitions. Referring back to FIG. 5, for example, the polarity of current flow can be used to generate additional encoding states such as A-to-B positive, A-to-B negative, B-to-C positive, B-to-C negative, C-to-A positive, and C-to-A negative. Having twice the number of encoding states, the number of state transitions and, subsequently, the number of data bits that can be encoded during each state transition can be increased. This encoding scheme is referred to as polarity encoded three phase modulation.

FIG. 8 illustrates an example state table 800 of a polarity encoded three phase modulation data encoding scheme. As understood by a person skilled in the art based on the teachings herein, other state diagrams may also possible with varied but equivalent mappings of state transitions to transmitted bits.

According to state table 800, two data bits are transmitted during each state transition, resulting in a doubling of the capacity of the data encoding scheme of FIG. 3. Also note that state transitions in state table 800 still conform to being circular as illustrated in state diagram 200 of FIG. 2.

In other embodiments, state transitions in example state table 800 can be further divided to generate additional transitions, thereby allowing for a further increase in the capacity of the encoding scheme. For example, state transition (A-to-B positive or negative to B-to-C positive) can be divided into two transitions (A-to-B positive to B-to-C positive) and (A-to-B negative to B-to-C positive). For example, from state A-to-B positive, the next state can be any one of the following five states: A-to-B negative, B-to-C positive, B-to-C negative, C-to-A positive or C-to-A negative. This allows $\log_2(5)$ or approximately 2.3216 bits of information to be encoded in a single state transition. Using this technique, it is possible to encode 16 bits of information in 7 consecutive state transitions.

Figure 12:
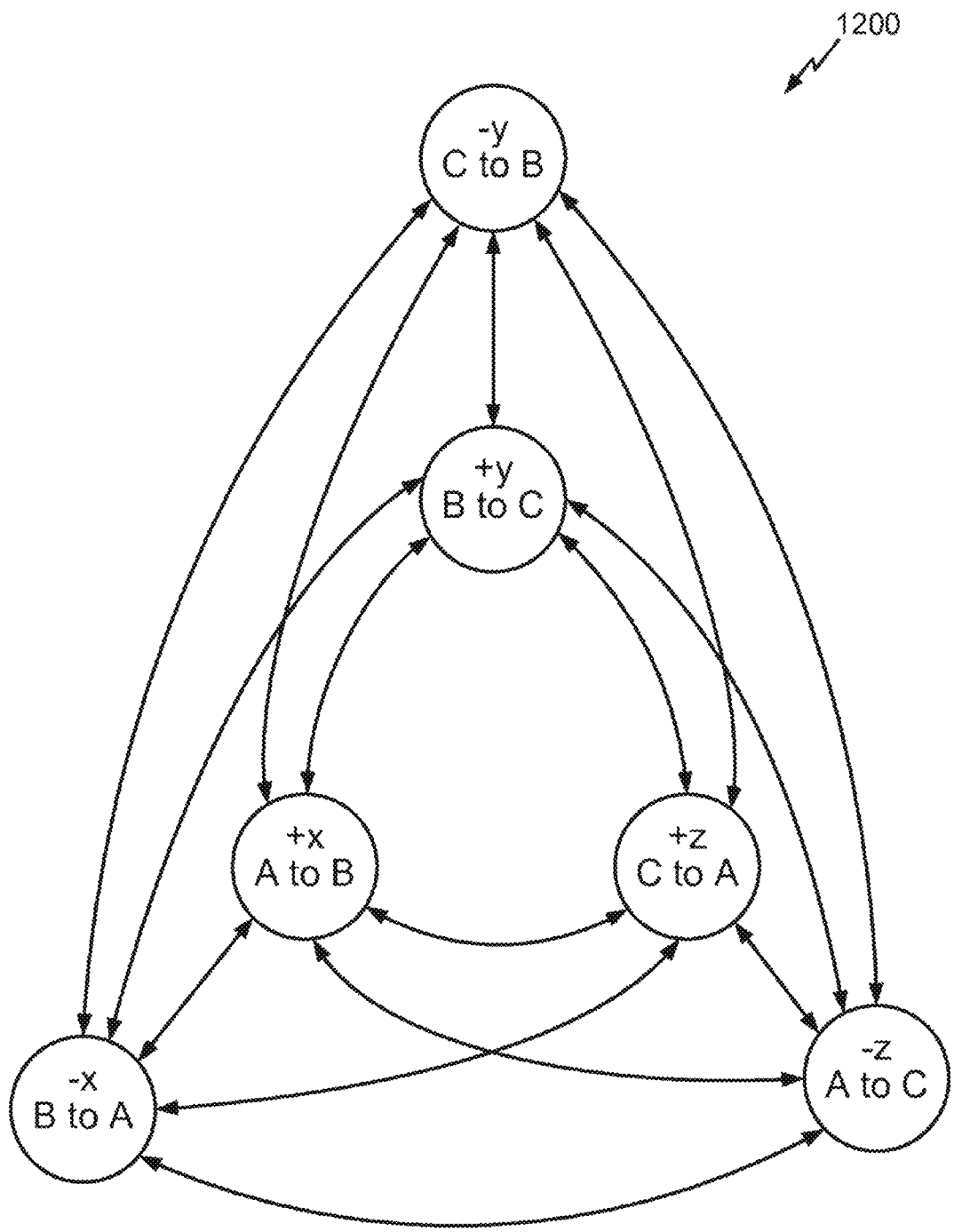
FIG. 12 illustrates an example state diagram of a polarity encoded three phase modulation data encoding scheme.

FIG. 12 illustrates an example state diagram 1200 based on the polarity encoded three phase modulation data encoding scheme, which shows all possible state transitions between the different encoding states.

Figure 9:
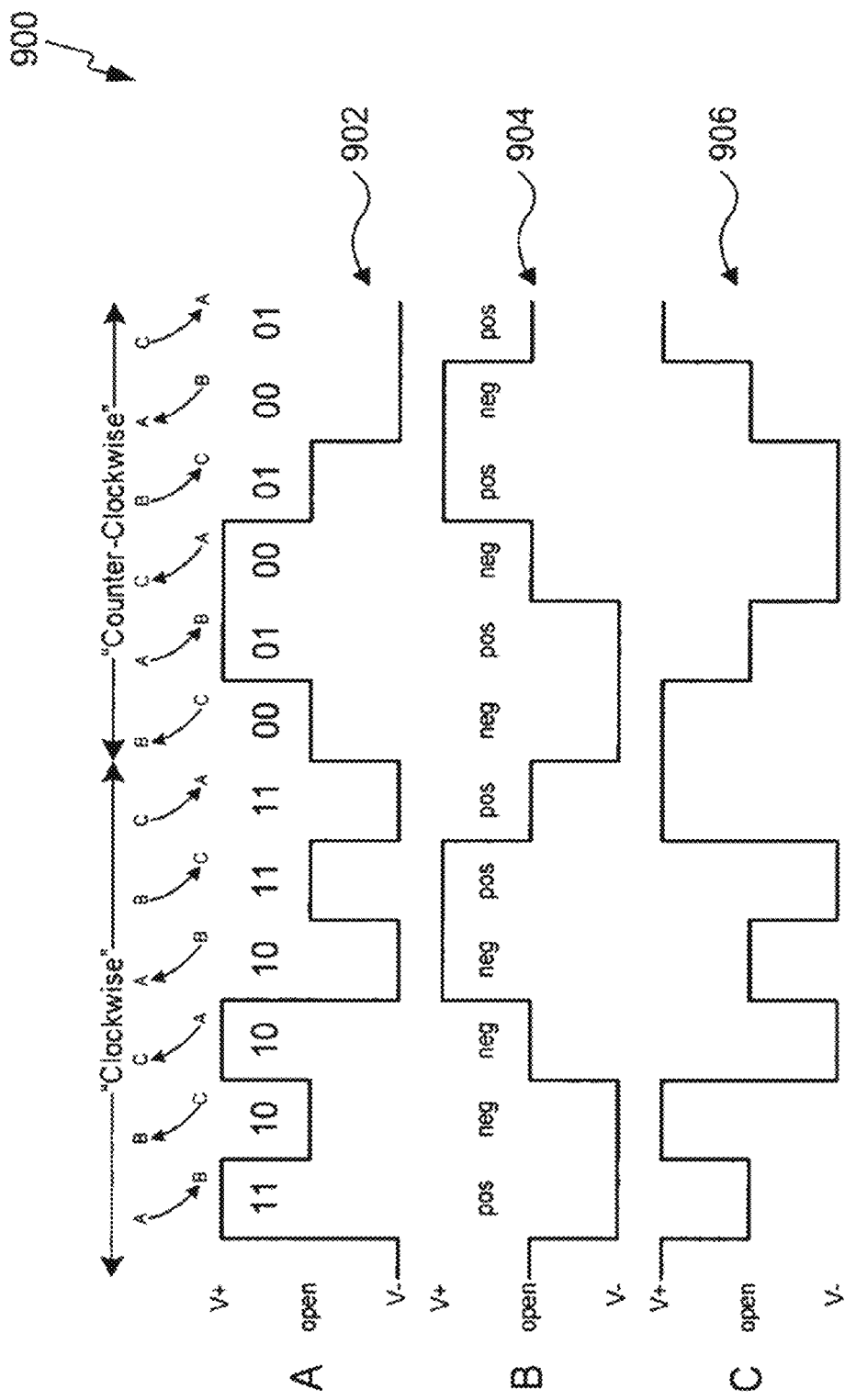
FIG. 9 is an example that illustrates a polarity encoded three phase modulation data encoding scheme according to the state diagram of FIG. 8.

FIG. 9 is an example 900 that illustrates a polarity encoded three phase modulation data encoding scheme according to state diagram 800 of FIG. 8.

A 3-phase signal that rotates in two directions is transmitted using three conductors A, B, and C. The three signals 902, 904, and 906 (carried by conductors A, B, and C) that make up the 3-phase signal are independent, with each signal being 120 degrees out of phase relative to the remaining two.

At any time, exactly two of conductors A, B, and C carry a signal, with the data encoding states being defined both in terms of signal flow between conductors and the polarity of said signal flow. Data encoding is done according to the state transitions as defined in state diagram 800. In one embodiment, clockwise state transitions (A-to-B to B-to-C, B-to-C to C-to-A, and C-to-A to A-to-B) are used to transmit data sequences starting with a logic 1 (10 and 11) and counter-clockwise state transitions (A-to-B to C-to-A, B-to-C to A-to-B, and C-to-A to B-to-C) are used to transmit data sequences starting with a logic zero (00 and 01).

Figure 13:
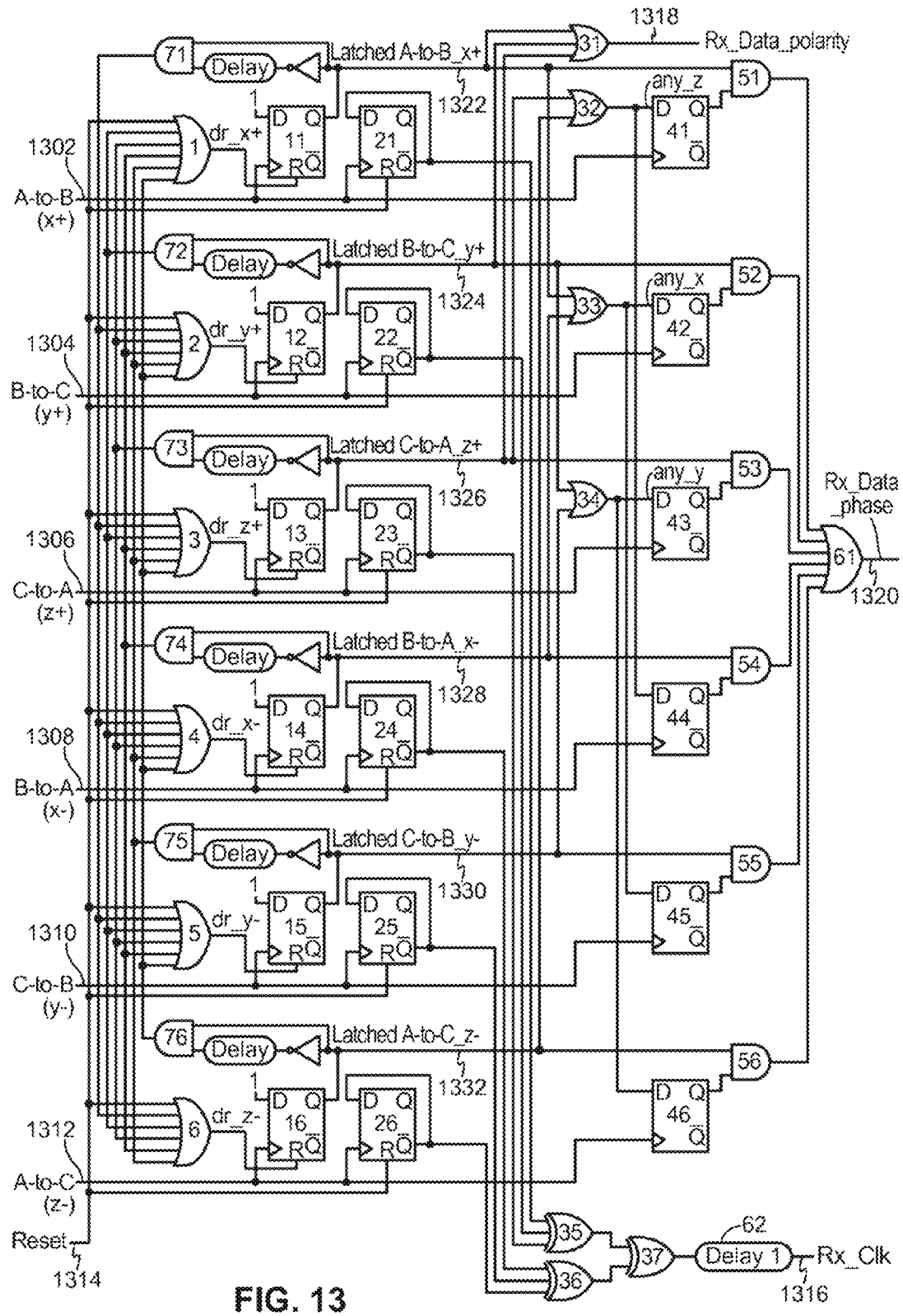
FIG. 13 illustrates an example data recovery circuit for a polarity encoded three phase modulation data encoding scheme.

FIG. 13 illustrates an example data recovery circuit 1300 which can be used to decode data transmitted according to a polarity encoded three phase modulation data encoding scheme. Other data recovery circuit implementation can also be used as would be understood by a person skilled in the art based on the teachings herein. The operation of recovery circuit 1300 is described below.

Recovery circuit 1300 receives input signals 1302, 1304, 1306, 1308, 1310, and 1312 from preceding analog circuits. At any time, only one of signals 1302, 1304, 1306, 1308, 1310, and 1312 can have a value of one, depending on which of the encoding states just occurred. In implementation, overlaps or gaps between the signals may occur. Inputs signals 1302, 1304, 1306, 1308, 1310, and 1312 are respectively coupled to the clock inputs of D flip flops 11-16. Each of D flip flops 11-16 has its D data input coupled to a logic one, which causes its Q output to have a value of one whenever its respective clock input experiences a rising edge transition. For example, D flip flop 11 will have a Q output of one whenever input signal 1302 experiences a rising edge transition, or equivalently, whenever state A-to-B positive occurs. As such, D flip flops 11-16 capture which of the six states has just occurred, as indicated by their respective Q outputs 1322, 1324, 1326, 1328, 1330, 1332. Since only one state can occur at any time, only one of outputs 1322, 1324, 1326, 1328, 1330, 1332 can continue to have a value of one at any time. As will be further described below, there will be a short overlap whenever a new state occurs with the Q outputs corresponding to the current state and the new state both having a value of one for the duration of the delay to reset the flip-flops.

When any of the states is captured by one of D flip flops 11-16, the other flip flops will be reset. In circuit 1300, this is achieved using OR gates 1-6, which generate reset signals for respective D flip flops 11-16. OR gates 1-6 each receives as inputs pulses caused by rising edges on the Q outputs of D flip flops 11-16 except for the Q output of its respective D flip-flop and a Reset signal 1314. For example, OR gate 1 receives pulses caused by rising edges on the Q outputs 1324, 1326, 1328, 1330, and 1330 (but not Q output 1322 of its respective D flip flop 11) of D flip-flops 12-16 and Reset signal 1314. Accordingly, the output of OR gate 1 will be one whenever any state other than A-to-B positive occurs or if Reset signal 1314 is asserted. One the other hand, when state A-to-B positive occurs and Reset signal 1341 is not asserted, OR gate 1 will output a value of zero.

In an embodiment, to ensure that D flip-flops 11-16 are only reset momentarily when a non-respective state occurs, the Q outputs of D flip-flops 11-16 are coupled to OR gates 1-6 through a circuitry, which ensures that OR gates 1-6 are only provided with a pulse and not a continuous signal of value one. For example, Q output 1322 of D flip-flop 11 is coupled to OR gates 2-6 through an AND gate 71. AND gate 71 receives as inputs Q output 1322 and a delayed inverted version of Q output 1322. Note that right before D flip-flop 11 captures an A-to-B positive state occurrence, the output of AND gate 71 is zero because Q output 1322 is zero (D flip-flop 11 would have been reset previously). On the other hand, the delayed inverted version of Q has a value of one. When the A-to-B positive input occurs, Q output 1322 changes to one. The delayed inverted version of Q maintains a value of one for the duration of the delay (generated by a delay element as illustrated) before changing to zero. Accordingly, for the duration of the delay, AND gate 71 will output a value of one, creating a pulse which resets flip-flops 12-16.

D flip-flops 21-26 are used to generate a double data rate clock signal Rx_Clk 1316, which transitions whenever a new input is presented. D flip-flops 21-26 respectively receive as clock inputs input signals 1302, 1304, 1306, 1308, 1310, and 1312. D flip-flops 21-26 also receive Reset signal 1314. As shown in FIG. 13, each of D flip flops 21-26 has its Q_bar output fed back to its D data input. As such, for each of D flip-flops 21-26, whenever its respective input clock signal experiences a rising edge transition, its Q_bar output will toggle from one to zero or from zero to one. The Q_bar outputs of D flip-flops 21-26 are input together through XOR gates 35 and 36, as illustrated in FIG. 13. The outputs of XOR gates 35 and 36 are, in turn, input together through XOR gate 37. XOR gate 37 will output a value of one whenever an odd number of the Q_bar outputs of D flip-flops 21-26 have a value of one. Since only one of the Q_bar outputs of D flip-flops 21-26 will toggle at any one time while the others will maintain the same value, the output of XOR 37 will toggle for each change in inputs 1302, 1304, 1306, 1308, 1310, and 1312. This generates double data rate clock signal Rx_Clk 1316. In an embodiment, a delay element 62 is used to ensure that Rx_Clk signal is in sync with the other signals that are output by data recovery circuit 1300.

OR gate 31 generates Rx_Data_Polarity signal 1318, which indicates whether the state that just occurred is of positive or negative polarity. OR gate 31 receives as inputs the Q outputs 1322, 1324, and 1326 of D flip-flops 11-13, respectively. As such, OR gate 31 outputs a value of one whenever a positive polarity (A-to-B positive, B-to-C positive, or C-to-A positive) input occurs. On the other hand, Rx_Data_Polarity signal 1318 will have a value of zero when a negative polarity state occurs.

OR gates 32 33, and 34 are used to capture respectively when a C-to-A state (positive or negative polarity), an A-to-B state (positive or negative polarity), and a B-to-C state (positive or negative polarity) occurs regardless of polarity. For example OR gate 32 receives as inputs Q_outputs 1326 and 1332 of D flip-flops 13 and 16, respectively. As such, OR gate 32 outputs a value of one whenever C-to-A positive or C-to-A negative occurs.

The outputs of OR gates 32-34 are coupled to the D data inputs of D flip-flops 41-46, as illustrated in FIG. 13. The output of OR gate 32 is coupled to the D inputs of D flip-flops 41 and 44. Similarly, the output of OR gate 33 is coupled to the D inputs of D flip-flops 42 and 45, and the output of OR gate 34 is coupled to the D inputs of D flip-flops 43 and 46. At the same time, the clock inputs of D flip-flops 41-46 are respectively coupled to inputs 1302, 1304, 1306, 1308, 1310, and 1312. Accordingly, for example, D flip-flop 41 will have a Q output of value one whenever the previous state is C-to-A (regardless of polarity) and the current state is A-to-B positive. Referring to FIG. 12, this corresponds to the clockwise transitions into the state A-to-B positive from either of states C-to-A positive or C-to-A negative. Similarly, D flip-flop 44 will have a Q output of value one whenever the previous state is C-to-A (regardless of polarity) and the current state is A-to-B negative. Referring to FIG. 12, this corresponds to the clockwise transitions into the state A-to-B negative from either of states C-to-A positive or C-to-A negative. Accordingly, D flip-flops 41-46 each captures one of the six clockwise transitions in state diagram 1200 in FIG. 12.

The Q outputs of D flip-flops 41-46 are input together with respective Q outputs of D flip-flops 11-16 into respective AND gates 51-56, as illustrated in FIG. 13. For example, the Q output of D flip-flop 41 is input together with the Q output 1322 of D flip-flop 11 into AND gate 51. AND gates 51-56 are used to ensure that only one of the six clockwise transitions is reflected at any time. In other words, only one of the outputs of AND gates 51-56 can have a value of one at any time. The outputs of AND gates 51-56 are input together into an OR gate 61 to generate Rx_Data_Phase 1320. Accordingly, Rx_Data_Phase 1320 has a value of one whenever a clockwise phase transition occurs and a value of zero otherwise. Note that Rx_Data_Phase 1320 can have a value of zero if either a counter-clockwise transition or a polarity-only (same phase transition; e.g., A-to-B positive to A-to-B negative) transition occurs. For example, if the current state is A-to-B positive, recovery circuit 1300 would output the same values for Rx_Data_polarity 1318 and Rx_Data_phase 1320 if the next state is C-to-A negative or A-to-B negative. Therefore, additional circuitry is required to distinguish between these types of transitions.

Figure 14:
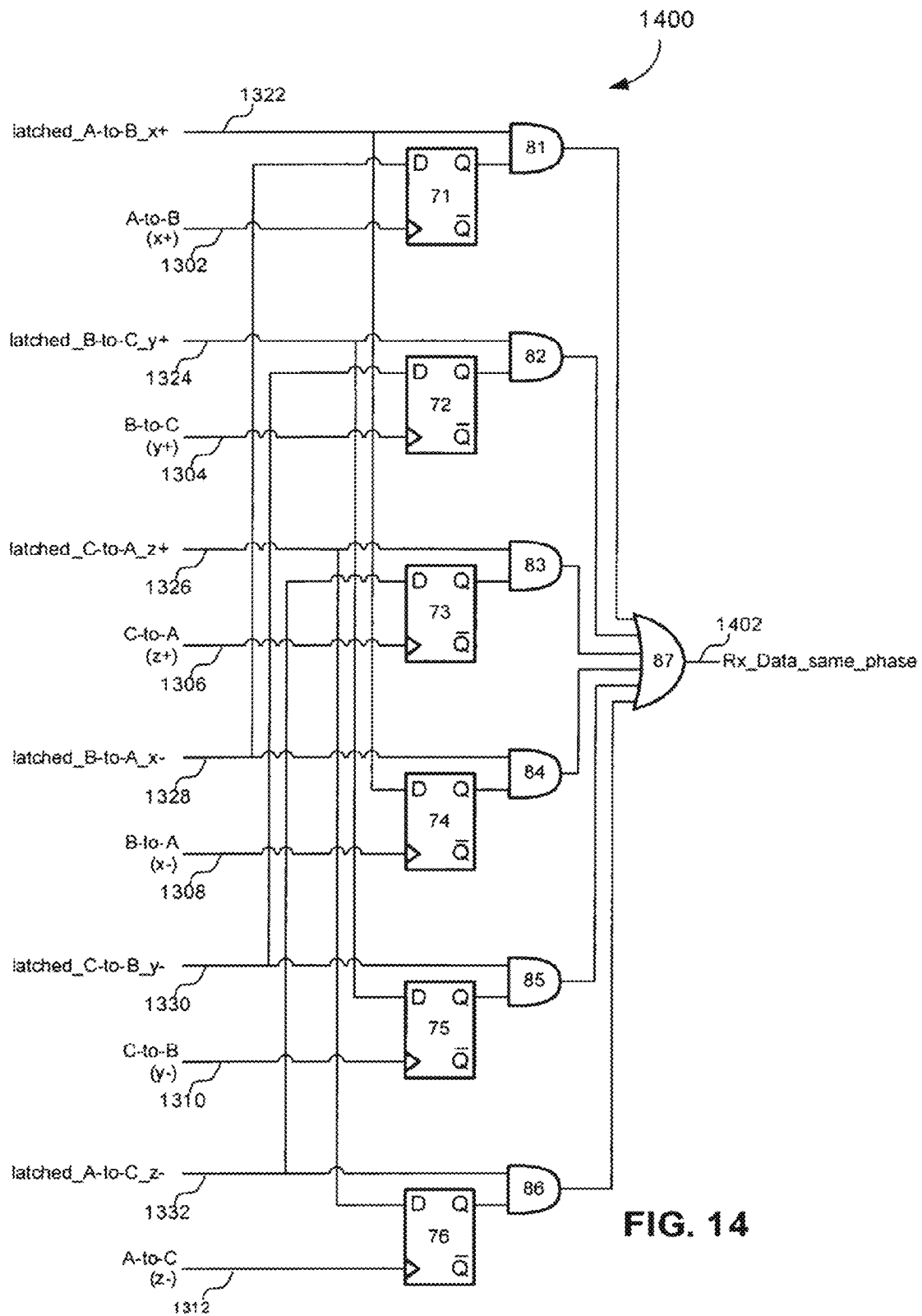
FIG. 14 illustrates additional circuitry of the example data recovery circuit of FIG. 13.

FIG. 14 illustrates additional circuitry 1400 for capturing polarity-only transitions. Inputs to circuitry 1400 include input signals 1302, 1304, 1306, 1308, 1310, and 1312 and the Q outputs 1322, 1324, 1326, 1328, 1330, and 1332 of D flip-flops 11-16. Circuitry 1400 includes D flip-flops 71-76, which are used to capture polarity-only transitions. For example, D flip-flop 71 receives input signal 1302 as clock input and Q output signal 1328 as D data input and is used to capture A-to-B negative to A-to-B positive transitions. Note that when A-to-B negative occurs, Q output 1328 will have a value of one. Subsequently, when A-to-B positive occurs, Q output 1328 will continue to have a value of one for the duration of the delay between the time when Q output 1322 changes value to one and the time when flip-flops 12-16 are reset. During that delay duration, both input signal 1302 and Q output 1328 will have a value of one, causing the Q output of D flip-flop 71 to change to a value of one. This also causes the output of AND gate 81 to have a value of one. The operation of D flip-flops 72-76 and respective AND gates 82-86 is similar.

Outputs of AND gates 81-86 are input together into an OR gate 87, which generates output signal Rx_Data_same_phase 1402. Output signal Rx_Data_same_phase 1402 thus has a value of one whenever any one of the six possible polarity-only state transitions occurs. As such, Rx_Data_same_phase 1402 can be used to determine whether a transition is polarity-only or counter-clockwise, whenever Rx_Data_phase 1320 of circuitry 1300 has a value of zero.

Note that circuitry 1400 is operable together with data recovery circuit 1300 of FIG. 13. In other words, the output Rx_Data_same_phase 1402 of circuitry 1400 is provided together with outputs Rx_Clk 1316, Rx_Data_polarity 1318, and Rx_Data_phase 1320 of circuit 1300 to a subsequent decoder stage for decoding, as will be illustrated further below.

FIG. 15 is an example embodiment 1500 of a decoder 1502 that can be used to decode the outputs generated by the data recovery circuit illustrated in FIGS. 13 and 14. Decoder 1502 receives seven input sets 1504, 1506, 1508, 1510, 1512, 1514, and 1516. In example embodiment 1500, each input set is a 3-bit input with one bit for each of the Rx_Data_phase, Rx_Data_polarity, and Rx_Data_same_phase outputs of the data recovery circuit illustrated in FIGS. 13 and 14. Decoder 1502 decodes the received seven 3-bit input sets to generate a 16-bit data output 1518. Other variations of decoder 1502 are also possible as may be understood by a person skilled in the art. For example, decoder 1502 may receive more or less than seven input sets and/or generate a different length data output 1518.

Example Serial Interface Implementations

Figure 10:
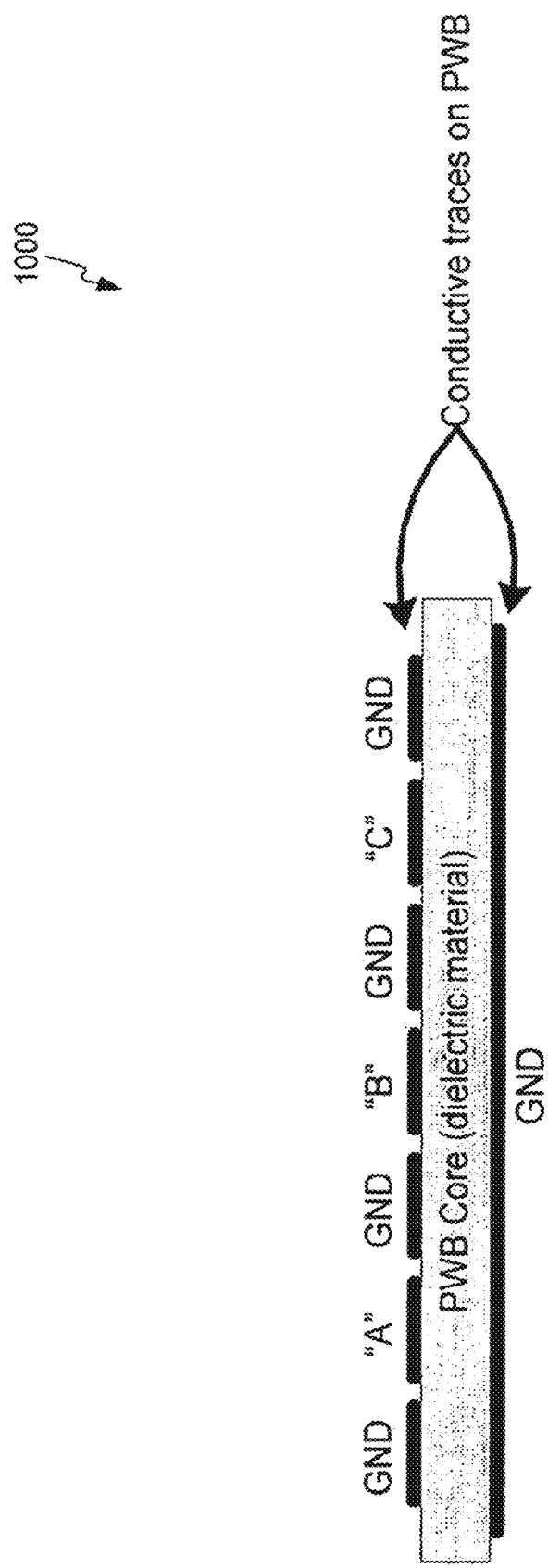
FIG. 10 illustrates an example implementation of signals conductors on a printed wiring board for enabling the three phase modulation data encoding schemes.

FIGS. 10 and 11 illustrate example serial interface implementations employing the three phase modulation data encoding schemes of the present invention. FIG. 10 illustrates an example implementation 1000 on a printed wiring board. As shown, three conductors A, B, and C are interleaved with ground on an upper layer with a dielectric core separating them from ground in a lower layer. In one embodiment, the impedance from any conductor to ground has a value Z0. FIG. 11 illustrates an example implementation 1100 using a twisted trio cable.

Three Phase Modulation for Mobile Display Digital Interface (MDDI)

The Mobile Display Digital Interface (MDDI) is a cost-effective, low power consumption, transfer mechanism that enables very-high-speed serial data transfer over a short-range communication link between a host and a client. In certain embodiments, an MDDI interface may benefit from using the three phase modulation data encoding schemes of the present invention.

In one aspect, an MDDI host may comprise one of several types of devices that can benefit from using the data encoding schemes of the present invention. For example, the host could be a portable computer in the form of a handheld, laptop, or similar mobile computing device. It could also be a Personal Data Assistant (PDA), a paging device, or one of many wireless telephones or modems. Alternatively, the host could be a portable entertainment or presentation device such as a portable DVD or CD player, or a game playing device. Furthermore, the host can reside as a host device or control element in a variety of other widely used or planned commercial products for which a high speed communication link with a client is desired. For example, a host could be used to transfer data at high rates from a video recording device to a storage based client for improved response, or to a high resolution larger screen for presentations. In general, those skilled in the art will appreciate the wide variety of modern electronic devices and appliances that may benefit from the use of this interface, as well as the ability to retrofit older devices with higher data rate transport of information utilizing limited numbers of conductors available in either newly added or existing connectors or cables. At the same time, an MDDI client may comprise a variety of devices useful for presenting information to an end user, or presenting information from a user to the host. For example, a micro-display incorporated in goggles or glasses, a projection device built into a hat or helmet, a small screen or even holographic element built into a vehicle, such as in a window or windshield, or various speaker, headphone, or sound systems for presenting high quality sound or music. Other presentation devices include projectors or projection devices used to present information for meetings, or for movies and television images. Other examples include the use of touch pads or sensitive devices, voice recognition input devices, security scanners, and so forth that may be called upon to transfer a significant amount of information from a device or system user with little actual "input" other than touch or sound from the user. In addition, docking stations for computers and car kits or desk-top kits and holders for wireless telephones may act as interface devices to end users or to other devices and equipment, and employ either clients (output or input devices such as mice) or hosts to assist in the transfer of data, especially where high speed networks are involved. However, those skilled in the art will readily recognize that the present invention is not limited to these devices, there being many other devices on the market, and proposed for use, that are intended to provide end users with high quality images and sound, either in terms of storage and transport or in terms of presentation at playback. The present invention is useful in increasing the data throughput between various elements or devices to accommodate the high data rates needed for realizing the desired user experience.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for decoding data, comprising:
receiving a three-phase signal from each of three conductors of a communication link, wherein the three-phase signal must be transmitted on each of the three conductors in different phases;
deriving a receive clock from transitions between encoding states of the three conductors; and
decoding data from a sequence of encoding states of the three conductors using the receive clock,
wherein during a first time interval of a first pair of sequential time intervals, no current flows in a first conductor of the three conductors while a current flows between a second conductor of the three conductors and a third conductor of the three conductors,
wherein during a second time interval of the first pair of sequential time intervals:
no current flows in the second conductor while a current flows between the first conductor and the third conductor when data to be encoded at a transition between the first pair of sequential time intervals has a first value, and
no current flows in the third conductor while a current flows between the first conductor and the second conductor when the data to be encoded at the transition between the first pair of sequential time intervals has a second value,
wherein N encoding states are defined for the communications link, including at least three encoding states defined by flow of current in the three conductors,
wherein a change of encoding state to one of N−1 available encoding states occurs at each transition between sequential time intervals, and
wherein N is an integer greater than or equal to six.

2. The method of claim 1, wherein data is encoded in the change of encoding state at a transition between each pair of sequential time intervals.

3. The method of claim 2, wherein current flows in a pair of conductors correspond to a first voltage level on one conductor and a second voltage level on another conductor, and wherein data is decoded based on a polarity of a difference between the first voltage level and the second voltage level.

4. The method of claim 1, wherein data is decoded based on a direction of flow of current in a pair of conductors.

5. The method of claim 1, wherein 16 bits of data are decoded from 8 or fewer transitions between sequential time intervals.

6. The method of claim 1, wherein:
during a first time interval of a second pair of sequential time intervals, a current flows in a first direction between a pair of conductors of the three conductors while no current flows in a remaining conductor of the three conductors, and
during a second time interval of the second pair of sequential time intervals, a current flows in a second direction between the pair of conductors while no current flows in the remaining conductor.

7. The method of claim 1, wherein current flows in a pair of conductors correspond to a first voltage level on one conductor and a second voltage level on another conductor, and wherein decoding data is based on a polarity of a difference between the first voltage level and the second voltage level, thereby defining N=6 possible encoding states.

8. The method of claim 7, wherein up to $\log_2(5)$ bits are encoded per transition between each pair of sequential time intervals.

9. An apparatus for decoding data, comprising:
means for receiving a three-phase signal from each of three conductors of a communication link, wherein the three-phase signal must be transmitted on each of the three conductors in different phases;
means for deriving a receive clock from transitions between encoding states of the three conductors; and
means for decoding data from a sequence of encoding states of the three conductors using the receive clock,
wherein during a first time interval of a first pair of sequential time intervals, no current flows in a first conductor of the three conductors while a current flows between a second conductor of the three conductors and a third conductor of the three conductors,
wherein during a second time interval of the first pair of sequential time intervals:
no current flows in the second conductor while a current flows between the first conductor and the third conductor when data to be encoded at a transition between the first pair of sequential time intervals has a first value, and
no current flows in the third conductor while a current flows between the first conductor and the second conductor when the data to be encoded at the transition between the first pair of sequential time intervals has a second value,
wherein N encoding states are defined for the communications link, including at least three encoding states defined by flow of current in the three conductors,
wherein a change of encoding state to one of N−1 available encoding states occurs at each transition between sequential time intervals, and
wherein N is an integer greater than or equal to six.

10. The apparatus of claim 9, wherein data is encoded in the change of encoding state at a transition between each pair of sequential time intervals.

11. The apparatus of claim 10, wherein current flows in a pair of conductors correspond to a first voltage level on one conductor and a second voltage level on another conductor, and wherein the means for decoding data is configured to decode data based on a polarity of a difference between the first voltage level and the second voltage level.

12. The apparatus of claim 9, wherein the means for decoding data is configured to decode data based on a direction of flow of current in a pair of conductors.

13. The apparatus of claim 9, wherein 16 bits of data are decoded from 8 or fewer transitions between sequential time intervals.

14. The apparatus of claim 9, wherein:
during a first time interval of a second pair of sequential time intervals, a current flows in a first direction between a pair of conductors of the three conductors while no current flows in a remaining conductor of the three conductors, and
during a second time interval of the second pair of sequential time intervals, a current flows in a second direction between the pair of conductors while no current flows in the remaining conductor.

15. The apparatus of claim 9, wherein current flows in a pair of conductors correspond to a first voltage level on one conductor and a second voltage level on another conductor, and wherein the means for decoding data is configured to decode data based on a polarity of a difference between the first voltage level and the second voltage level, wherein N=6 possible encoding states are defined.

16. An apparatus that decodes data from multiple connectors of a communication interface, comprising:
a processing circuit configured to:
receive a three-phase signal from each of three conductors of a communication link, wherein the three-phase signal must be transmitted on each of the three conductors in different phases;
derive a receive clock from transitions between encoding states of the three conductors; and
decode data from a sequence of encoding states of the three conductors using the receive clock,
wherein during a first time interval of a first pair of sequential time intervals, no current flows in a first conductor of the three conductors while a current flows between a second conductor of the three conductors and a third conductor of the three conductors,
wherein during a second time interval of the first pair of sequential time intervals:
no current flows in the second conductor while a current flows between the first conductor and the third conductor when data to be encoded at a transition between the first pair of sequential time intervals has a first value, and
no current flows in the third conductor while a current flows between the first conductor and the second conductor when the data to be encoded at the transition between the first pair of sequential time intervals has a second value,
wherein N encoding states are defined for the communications link, including at least three encoding states defined by flow of current in the three conductors,
wherein a change of encoding state to one of N−1 available encoding states occurs at each transition between sequential time intervals, and
wherein N is an integer greater than or equal to six.

17. The apparatus of claim 16, wherein data is encoded in the change of encoding state at a transition between each pair of sequential time intervals.

18. The apparatus of claim 17, wherein current flows in a pair of conductors correspond to a first voltage level on one conductor and a second voltage level on another conductor, and wherein data is decoded based on a polarity of a difference between the first voltage level and the second voltage level.

19. The apparatus of claim 16, wherein data is decoded based on a direction of flow of current in a pair of conductors.

20. The apparatus of claim 16, wherein 16 bits of data are decoded from 8 or fewer transitions between sequential time intervals.

21. The apparatus of claim 16, wherein:
during a first time interval of a second pair of sequential time intervals, a current flows in a first direction between a pair of conductors of the three conductors while no current flows in a remaining conductor of the three conductors, and
during a second time interval of the second pair of sequential time intervals, a current flows in a second direction between the pair of conductors while no current flows in the remaining conductor.

22. The apparatus of claim 16, wherein current flows in a pair of conductors correspond to a first voltage level on one conductor and a second voltage level on another conductor, and wherein the processing circuit is configured to decode data based on a polarity of a difference between the first voltage level and the second voltage level, thereby defining N=6 possible encoding states.

23. The apparatus of claim 22, wherein up to $\log_2(5)$ bits are encoded per transition between each pair of sequential time intervals.

24. A non-transitory machine-readable storage medium having instructions stored thereon for encoding data, which when executed by at least one processor causes the at least one processor to:
receive a three-phase signal from each of three conductors of a communication link, wherein the three-phase signal must be transmitted on each of the three conductors in different phases;
derive a receive clock from transitions between encoding states of the three conductors; and
decode data from a sequence of encoding states of the three conductors using the receive clock,
wherein during a first time interval of a first pair of sequential time intervals, no current flows in a first conductor of the three conductors while a current flows between a second conductor of the three conductors and a third conductor of the three conductors,
wherein during a second time interval of the first pair of sequential time intervals:
no current flows in the second conductor while a current flows between the first conductor and the third conductor when data to be encoded at a transition between the first pair of sequential time intervals has a first value, and
no current flows in the third conductor while a current flows between the first conductor and the second conductor when the data to be encoded at the transition between the first pair of sequential time intervals has a second value,
wherein N encoding states are defined for the communications link, including at least three encoding states defined by flow of current in the three conductors,
wherein a change of encoding state to one of N−1 available encoding states occurs at each transition between sequential time intervals, and
wherein N is an integer greater than or equal to six.

25. The storage medium of claim 24, wherein data is encoded in the change of encoding state at a transition between each pair of sequential time intervals.

26. The storage medium of claim 25, wherein current flows in a pair of conductors correspond to a first voltage level on one conductor and a second voltage level on another conductor, and wherein data is decoded based on a polarity of a difference between the first voltage level and the second voltage level.

27. The storage medium of claim 24, wherein data is decoded based on a direction of flow of current in a pair of conductors.

28. The storage medium of claim 24, wherein 16 bits of data are decoded from 8 or fewer than 8 transitions between sequential time intervals.

29. The storage medium of claim 24, wherein:
during a first time interval of a second pair of sequential time intervals, a current flows in a first direction between a pair of conductors of the three conductors while no current flows in a remaining conductor of the three conductors, and
during a second time interval of the second pair of sequential time intervals, a current flows in a second direction between the pair of conductors while no current flows in the remaining conductor.

30. The storage medium of claim 24, wherein current flows in a pair of conductors correspond to a first voltage level on one conductor and a second voltage level on another conductor, and wherein data is decoded based on a polarity of a difference between the first voltage level and the second voltage level, thereby defining N=6 possible encoding states, and wherein up to $\log_2(5)$ bits are encoded per transition between each pair of sequential time intervals.

* * * * *